United States Patent Office 3,382,243
Patented May 7, 1968

3,382,243
ACETAMIDES AND THEIR PREPARATION
Stanley C. Bell, Philadelphia, Ronald J. McCaully, Malvern, and Scott J. Childress, Philadelphia, Pa., assignors to American Home Products Corporation, New York, N.Y., a corporation of Delaware
No Drawing. Filed May 17, 1965, Ser. No. 456,533
22 Claims. (Cl. 260—247.1)

ABSTRACT OF THE DISCLOSURE

The invention involves the preparation of N-substituted acetamido compounds and their reaction with compounds characterized as possessing an active hydrogen atom and a nucleophile group wherein the nucleophile attaches to the alpha-carbon of the acetyl nucleus. The compounds produced have been found to possess at least a central nervous system depressant action, thus making them useful in the field of pharmacology.

This invention relates to novel substituted 2-acylamino acetamides, the intermediates for preparing them, and particularly the processes for the manufacture and the use thereof.

Compounds having an N-acyloxyamino or N,N-acyloxyacylamino group are known to react with basic reagents whereby the acyloxy substituent on the amino nitrogen is hydrolyzed to a hydroxy group. Such reactions have been reported by various investigators, for example, as disclosed in the Journal of the American Chemical Society, 83, 1263 (1961); 85, 3039 (1963); and 86, 837 (1964).

The principal process of the invention involves the concept of treating an N-acyloxy-N-acyl-amino acetyl nucleus with a compound possessing at least one reactive hydrogen atom combined with a nucleophilic group, whereby the latter, surprisingly, attaches as a substituent to the alpha carbon of the acetyl nucleus, and the acyloxy radical is replaced by a hydrogen atom. In a more limited aspect, the acetyl nucleus may be attached through its carbonyl group to a primary or a secondary amino thus comprising a mono- or di-substituted amido group.

The novel reaction may be more specifically illustrated as follows:

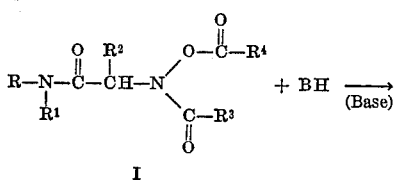

I

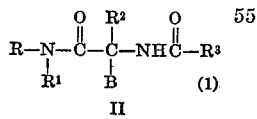

(1)

II

In the above scheme, R is intended to stand for an aromatic, aliphatic or heterocyclic radical while $R^1$ represents hydrogen, alkyl, or an aryl radical. $R^2$ may be hydrogen or an alkyl radical, while $R^3$ and $R^4$ each stand for an alkyl, aryl, alkoxy or aryloxy, radical, with $R^3$ and $R^4$ beign either similar or dissimilar radicals.

The radical B is intended to stand for a nucleophilic group such as an amino, a substituted amino, a morpholino, a lactam anion, a sulfonamide anion, a substituted oxy or a substituted mercapto group. Thus, the nucleophilic reactant represented as BH, is intended to cover ammonia, a mono- or di-substituted amine, the substituent or substituents beig lower alkyl, aryl, or aralkyl radicals; nitrogen-containing heterocyclic compounds, such as pyridone or morpholine; lower alkanols, for example ethanol; and the mercaptans, for example, the lower alkyl, aryl or phenyl (lower) alkyl mercaptans.

It is thought that the foregoing reaction also involves intermediate steps or reactions, wherein an electron shift takes place together with an eliminating of the acyloxy radical forming a transistory imino compound, which then reacts with the nucleophilic compound to saturate the molecule and add the nucleophile B to the carbon atom adjacent to the carbonyl group.

The above process is carried out by reacting an acyloxyacylamino compound with a solution of the nucleophilic reactant, the desired reaction taking place at a temperature within 0° to 150° C., and preferably within the range of 20° to 80° C. Solvents useful in the reaction may be the lower aliphatic alcohols, the lower alkyl ethers, diethyl ether, dioxane or other inert solvents in which the reactants are soluble. The reaction should take place under basic conditions, which may be realized by the characteristics of the nucleophilic reagent itself. Where the latter is weakly basic or is essentially unreactive as a base, as in the case of a lower alkanol, it is necessary to add a strongly basic material, for example, sodium hydroxide to cause the reaction to proceed in the desired direction. An amount of base in excess of the stoichiometric amount is desirable.

It may be mentioned that while the described reaction has been specifically illustrated with N-aryl-2-acyloxy-2-acylaminoacetamides, there is reason to assume that in general, the reaction would take place regardless of the differing substituents on the amido nitrogen or whether there was only N-mono- or N,N-di-substituents on the amido nitrogen group. This is based on the fact that the substituted nitrogen moiety of the amido radical has usually been found to have no influence on the course of the reaction. Therefore, it should be understood that as far as the inventive reaction is concerned, a mono- and a di-substituted amido nitrogen in the starting compounds are deemed equivalents.

The compounds as prepared by the aforesaid process and deemed patentable on the basis of their particular pharmacological activity are those of type II, which, as indicated previously, has the formula:

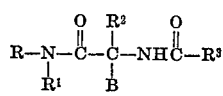

Compounds demonstrating pharmacological utility are those where $R^1$ and $R^2$ represent hydrogen while R represents either a mono- (lower) alicyclic radical or a mono- or di-substituted phenyl radical wherein the substituents are either halogen, but preferably chlorine, lower alkyl, carboxy, carbo-(lower) alkoxy, lower alkoxy or a sulfamoyl radical, while B represents either a mono-oxo (lower) alkylamino, a mono-phenyl (lower) alkylamino radical, an amino, a mono-(lower) alkylamino, a di-(lower) alkylamino, a heteroamino, for example morpholino or a lactam, a mercapto, preferably (lower) alkylmercapto, a sulfonamido, or a lower alkoxy radical; and where $R^3$ stands for a lower alkyl radical.

The above mentioned compounds may be characterized as generally white solids having relatively high melting points and crystallizable out of ethyl alcohol. They are substantially water-insoluble but soluble in the common polar solvents. When acid-addition salts can be formed, the latter are then water-soluble to a material degree. The structural configuration of the compounds was determined by the reactants used and confirmed by known measurement procedures including infra-red analysis and determination of the nuclear magnetic resonance spectrum.

The above compounds, when tested in mammals, demonstrated a central nervous system depressant action resulting in a generally relaxing or sedative effect. In addition, anticonvulsant action as well as antibacterial and analgesic effects were also noted.

Certain compounds of type II have a special utility, by reason of their ability to react to form pharmacologically useful benzodiazepines. Thus, compounds where R represents a benzophenone radical with B representing the amino radical, are capable of ring closing under suitable conditions to form benzodiazepines.

Specific intermediates formed in the preparation of the final acetamides and also deemed patentable have been found to possess utility, not only as required reactants, necessary for the process and for producing the final compounds, but also because they too have been found to demonstrate a central nervous system depressant activity. Such intermediates are illustrated by the formula:

R—NH—CO—CH—A
            |
            R² wherein R represents a mono-(lower) alicyclic ring, preferably cyclohexyl, or an aryl radical, more specifically the mono- or di-substituted phenyl radical:

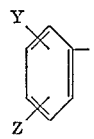

wherein Y or Z is intended to represent hydrogen, lower alkyl, preferably methyl; halogen, preferably chlorine; lower alkoxy, preferably methoxy; carbo-lower alkoxy, preferably carbomethoxy; or carboxy. In the case of di-substituents, the radicals are preferably dissimilar, although similar radicals are also contemplated. The radical $R^2$ is intended to represent either hydrogen or (lower) alkyl. The designation A is intended to stand for halogen, preferably chlorine or iodine, hydroxyamino, acylamino, hydroxyacylamino, or acyloxyacylamino, and in the latter case, preferably the acetoxyacetylamino radical.

The acyloxyacylamino compounds utilized as starting materials are prepared by one of the following procedures:

A selected chloroacetylchloride is condensed under known conditions with an amine forming the expected chloroacetamide. The chlorine is then displaced with iodide, also under known conditions, to form the corresponding iodoacetamide.

The isolated iodoacetamide is now reacted to form an hydroxyamino acetamide. This is carried out under carefully controlled reaction conditions utilizing hydroxylamine, preferably as the hydrochloride or sulfuric acid salt, in an alcoholic solvent, preferably ethanol. The reaction media must have sufficient basicity to yield free hydroxylamine and, therefore, enough base is added to give a stoichiometric excess of hydroxylamine. A pH from about neutrality to pH 9 will permit the reaction to proceed satisfactorily. A reaction temperature from about 50° C. to 100° C., preferably from about 70° C. to 80° C. has been found effective.

The hydroxylamino acetamide formed by the above described reaction is now acylated using an acyl chloride, or more preferably, an acid anhydride. Depending on the conditions, the reaction will result in the formation of an acyloxyacylamino acetamide or under milder conditions a hydroxyacylamino acetamide. The latter may then be condensed with a similar or dissimilar acyl chloride or acid anhydride to produce the acyloxyacylamino acetamide.

In carrying out the acylation reaction to obtain the acyloxyacylamino acetamide directly, the hydroxylamino acetamide is condensed with an acid anhydride or acyl halide, preferably, in the absence of a solvent, at a temperature of about 50° to 100° C., the higher end of the range being preferred.

The preparation of the starting compounds may be illustrated by the following reactions:

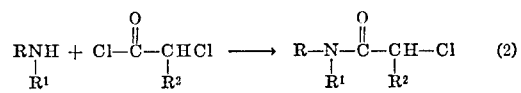

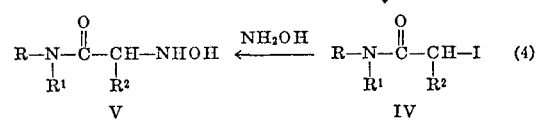

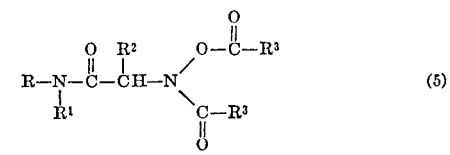

Where it is desired to provide different acyl groups on the amino nitrogen, the reaction with acid anhydride or acyl halide is carried out under relatively mild conditions to first produce an N-acyl hydroxyamino acetamide. This is then further condensed with a different anhydride or acyl halide. Thus, the reactions are carried out using an inert solvent such as methylene chloride or 1,2-dimethoxyethane and a temperature of about 20° to 40° C., which will result in stepwise addition and substitution on the amino nitrogen. The reactions may be illustrated as follows:

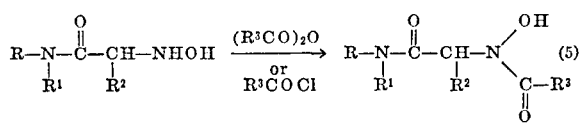

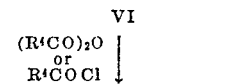

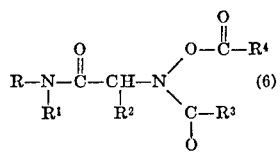

An alternative procedure for making the acyloxyacylamino acetamide starting materials may be illustrated by the following reaction path:

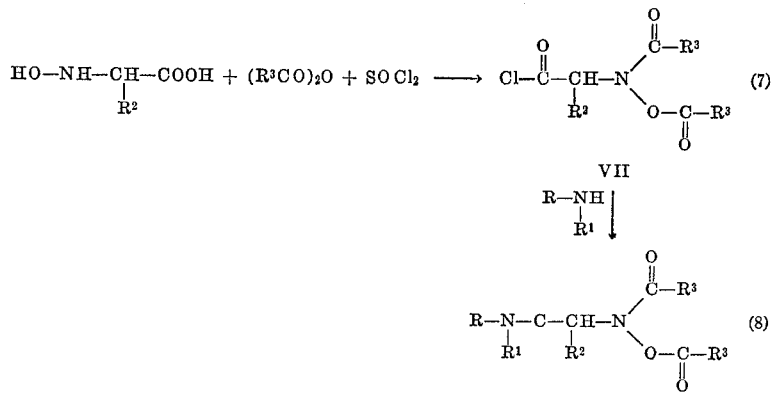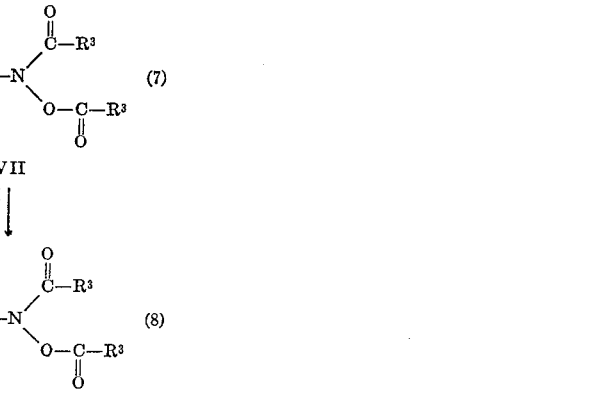

Reaction (7) is carried out by treating a hydroxyamino acetic acid with the selected acid anhydride for the initial acylation reaction, after which one adds the thionyl chloride. The minimum amount of anhydride necessary for complete reaction is used and the reaction is carried out at a temperature ranging from about 20° to 80° C. The temperature of reaction has been found to be critical and a temperature of about 60° to 70° C. will result in optimum yields. In place of the acid anhydride, one may use an acyl halide. Also, in place of thionyl chloride, which is preferred, one may use phosphorus pentachloride, or bromide.

The amination reaction identified as Reaction (8) is carried out at approximately room temperature, or, if necessary, at a temperature up to the refluxing temperature of the reaction mixture. This reaction replaces the reactive chlorine atom with the selected mono- or di-substituted amine to form the desired acetamide for the final, basic reaction.

In utilizing the compounds of the invention to produce the desired effects, they are intended to be combined with a carrier, either solid or liquid, in the form of tablets or capsules for oral ingestion or in the form of solutions, emulsions or suspensions intended for oral or parenteral use. One or more other active ingredients may be present. The solid carrier is generally an inert excipient such as lactose, starch or talc, while the carrier in the liquid form is either aqueous or oleaginous, containing, if desired, a solid suspending agent such as carboxymethyl cellulose. Where water solubility is desired, water soluble salts may be prepared in known manner using the usual organic or inorganic acid to produce pharmacologically acceptable acid-addition salts. Pharmacological effects are obtained with dosages ranging from about 5 to 100 mg. per kg.

The following examples illustrate various features of the invention in greater detail. Temperatures as given are to be considered in degrees centigrade.

EXAMPLE 1

2-iodo-4'-methoxyacetanilide: A mixture of 6.8 g. of 2-chloro-4'-methoxyacetanilide, 5.5 g. of sodium iodide and 200 ml. of acetone was refluxed for 3 hours, cooled and diluted with water. The resultant precipitate was collected and recrystallized from ethanol, giving a white product, M.P. 147–149°.

Analysis.—Calcd. for $C_9H_{10}INO_2$: C, 37.13; H, 3.46; N, 4.81; I, 43.56. Found: C, 37.38; H, 3.33; N, 5.02; I, 43.00.

EXAMPLE 2

2-iodoacetamido-5-chlorobenzoic acid, M.P. 186–188° is prepared from 2-chloroacetamido-5-chlorobenzoic acid and sodium iodide according to the procedure of Example 1.

Analysis.—Calcd. for $C_9H_7ClINO$: N, 4.12; Cl, 10.44; I, 37.38. Found: N, 4.38; Cl, 10.40; I, 37.4.

EXAMPLE 3

2-chloroacetamido-5-chlorobenzoic acid, was prepared from 40 g. of 5-chloroanthranilic acid and 34 g. of chloroacetylchloride and the product, M.P. 214–217°, was recrystallized from a water-alcohol mixture.

Analysis.—Calcd. for $C_9H_7Cl_2NO_3$: C, 43.56; H, 2.84; N, 5.64; Cl, 28.58. Found: C, 44.02; H, 3.08; N, 5.59; Cl, 28.40.

EXAMPLE 4

2-[hydroxy(benzoyl) amino]-4'-chloroacetanilide, M.P. 182–183°, was prepared by reacting 4'-chloro-2-hydroxyaminoacetanilide with one equivalent of benzoyl chloride in chloroform. The solvent was evaporated and the product was recrystallized from methylene chloride-carbon tetrachloride.

Analysis.—Calcd. for $C_{15}H_{13}ClN_2O_3$: C, 59.12; H, 4.30; N, 9.20; Cl, 11.64. Found: C, 58.99; H, 4.29; N, 9.04; Cl, 11.92.

EXAMPLE 5

2-[hydroxy(acetyl) amino]-4'-chloroacetanilide, M.P. 180–181°, is prepared from 4'-chloro-2-hydroxyaminoacetanilide and acetyl chloride by a procedure similar to that described in Example 4.

Calcd. for $C_{10}H_{11}ClN_2O_3$: C, 49.47; H, 4.57; N, 11.54; Cl, 14.61. Found: C, 49.38; H, 4.62; N, 11.38; Cl, 15.05

EXAMPLE 6

4'-chloro-2-hydroxyaminoacetanilide.—To a solution of 120 g. of 4'-chloro-2-iodoacetanilide in 800 ml. of ethanol, warmed to 75°, was added a solution of 88 g. of hydroxylamine hydrochloride in 400 cc. of 4 N sodium hydroxide solution. The solution was heated at 80° for 10 min., chilled, and diluted with 1 l. of water. 4'-chloro-2-hydroxyaminoacetanilide, 69 g., M.P. 135–138°, was obtained. The crude product was recrystallized from benzene to give a pure compound, M.P. 144–146°.

Analysis.—Calcd. for $C_8H_9ClN_2O_2$: C, 47.89; H, 4.52; N, 13.97; Cl, 17.67. Found: C, 48.35; H, 4.53; N, 13.73; Cl, 17.9.

EXAMPLE 7

4'-methoxy-2-hydroxyaminoacetanilide, M.P. 137–138°, is prepared from 2-iodo-4'-methoxyacetanilide and hydroxylamine hydrochloride according to the procedure of Example 6.

Analysis.—Calcd. for $C_9H_{12}N_2O_3$: C, 55.09; H, 6.17; N, 14.28. Found: C, 55.19; H, 5.84; N, 13.87.

EXAMPLE 8

5'-chloro-2-hydroxyaminoacetylanthranilic acid is prepared from 2-iodoacetamido-5-chlorobenzoic acid and hydroxylamine hydrochloride similar to the procedure of Example 6.

Analysis.—Calcd. for $C_9H_9ClN_2O_4$: C, 44.3; H, 3.7; Cl, 14.5. Found: C, 44.58; H, 3.78; Cl, 14.35.

EXAMPLE 9

2 - [acetoxy(acetyl)amino] - 5' - chloro - 2' - sulfamoylacetanilide.—A mixture of 2.0 g. of hydroxyaminoacetic acid was heated in 30 ml. of acetic anhydride with stirring for 20 min. at 60°. The excess acetic anhydride was removed in vacuo and the residue dissolved in 20 ml. of methylene chloride and 6 ml. of thionyl chloride and refluxed for 5 min. The solvent was removed in vacuo and the residue was dissolved in 30 ml. of methylene chloride and added to 8.4 g. of 5-chloro-2-sulfamylaniline in 60 ml. of 1,2-dimethoxyethane. The insoluble hydrochloride salt of the starting amine (4.4 g.) was filtered from the reaction mixture. The filtrate was concentrated to dryness and the residue recrystallized from ethanol giving 4.0 g. of product, M.P. 155–157°. A further recrystallization from ethanol gave a pure compound, M.P. 157–159°.

Analysis.—Calcd. for $C_{12}H_{14}ClN_3O_6S$: C, 39.61; H, 3.88; N, 11.55; Cl, 9.75; S, 8.81. Found: C, 39.96; H, 3.87; N, 11.63; Cl, 9.70; S, 8.40.

EXAMPLE 10

2 - [acetoxy(acetyl)amino] - 2',6'-dimethylacetanilide, M.P. 200.0–201.5° is prepared from hydroxyaminoacetic acid and 2,6-dimethylaniline according to the procedure of Example 9.

Analysis.—Calcd. for $C_{14}H_{18}N_2O_4$: C, 60.42; H, 6.52; N, 10.07. Found: C, 60.31; H, 6.20; N, 10.39.

EXAMPLE 11

2 - (2 - [acetoxy(acetyl)amino]acetamido) - 5-chlorobenzoic acid, M.P. 182–183°, is prepared from 5-chloroanthranilic acid, hydroxyaminoacetic acid, and acetic anhydride according to the procedure of Example 9.

Analysis.—Calcd. for $C_{13}H_{13}ClN_2O_6$: C, 47.50; H, 3.98; N, 8.52; Cl, 10.78. Found: C, 47.72; H, 4.13; N, 8.37; Cl, 10.7.

EXAMPLE 12

2 - (2-[acetoxy(acetyl)amino]acetamido) benzoic acid, methyl ester, M.P. 94–96°, is prepared from methyl anthranilate, hydroxyaminoacetic acid and acetic anhydride according to the procedure of Example 9.

Analysis.—Calcd. for $C_{14}H_{16}N_2O_6$: C, 54.54; H, 5.23; N, 9.09 Found: C, 54.69; H, 5.18; N, 8.96.

EXAMPLE 13

2 - [acetoxy(acetyl)amino] - N - cyclohexylacetamide, M.P. 182–184°, is prepared from cyclohexylamine, hydroxyaminoacetic acid and acetic anhydride according to the procedure of Example 9.

Analysis.—Calcd. for $C_{12}H_{20}N_2O_4$: C, 56.23; H, 7.86; N, 10.93. Found: C, 56.18; H, 7.79; N, 10.71.

EXAMPLE 14

N,N' - bis - (2-[acetoxy(acetyl)amino]acetyl)-o-phenylenediamine, M.P. 200–201°, is prepared from o-phenylenediamine and hydroxyaminoacetic acid and acetic anhydride according to the procedure of Example 9.

Analysis.—Calcd. for $C_{18}H_{22}N_4O_8$: C, 51.18; H, 5.25; N, 13.27. Found: C, 51.06; H, 5.29; N, 12.70.

EXAMPLE 15

2 - [acetoxy(acetyl)amino] - N - methylacetanilide.—This is prepared from N-methylaniline, hydroxyaminoacetic acid, and acetic anhydride according to the procedure of Example 9.

EXAMPLE 16

2 - [acetoxy(acetyl)amino] - 4'-chloroacetanilide.—A mixture of 4.0 g. 4'-chloro-2-hydroxyaminoacetanilide and 100 cc. of acetic anhydride was heated on the steam bath with stirring for 20 minutes. The txcess anhydride was removed in vacuo and a small amount of isopropanol was added to the residue to give 4.8 g. of pure product, M.P. 135–135.5°.

Analysis.—Calcd. for $C_{12}H_{13}ClN_2O_4$: C, 50.62; H, 4.60; N, 9.84. Found: C, 50.80; H, 4.61; N, 9.70.

EXAMPLE 17

2 - [acetoxy(benzoyl)amino] - 4'-chloroacetanilide.—This is prepared from 2-[hydroxy(benzoyl)amino]-4'-chloroacetanilide with acetic anhydride as described in Example 16.

EXAMPLE 18

2 - [acetoxy(acetyl)amino] - 4' - methoxyacetanilide, M.P. 146–147°, is prepared from 4'-methoxy-2-hydroxyaminoacetanilide and acetic anhydride according to the procedure of Example 16.

Analysis.—Calcd. for $C_{13}H_{16}N_2O_5$: C, 55.71; H, 5.75; N, 10.00. Found: C, 56.11; H, 5.95; N, 10.14.

EXAMPLE 19

2 - [acetoxy(acetyl)amino]-4'-chloropropionanilide.—A methanol solution of hydroxylamine hydrochloride (2.78 g.) was neutralized with 2.11 g. of sodium methoxide and filtered from the resultant sodium chloride. The methanolic hydroxylamine was refluxed with 5.25 g. of 4'-chloro-2-bromopropionanilide. Evaporation of the solvent in vacuo and recrystallization of the residue from aqueous methanol gave 4.2 g. of 4'-chloro-2-hydroxyamino-propionanilide, M.P. 89–90°.

A 3.0 g. portion of the 4'-chloro-2-hydroxyaminopropionanilide was added to a solution of 3.12 g. of acetic anhydride in 1,2-dichloroethane and the solution was stirred for 1.25 hr. at 26° and .75 hr. at 60°. Evaporation of the solvent in vacuo and recrystallization of the residue in aqueous methanol gave 3.07 g. of 2-[acetyl(hydroxy)amino]-4'-chloropropionanilide, acetate, M.P. 140.5–142.

Analysis.—Calcd. for $C_{13}H_{15}N_2O_4Cl$: C, 52.57; H, 5.06; N, 9.38; Cl, 11.81. Found: C, 52.10; H, 4.89; N, 9.12; Cl, 12.11.

EXAMPLE 20

N - [6 - chloro-4-oxo-4H-3, 1-benzoxazin-2-yl)acetoxy methyl] acetamide.—A solution of 3.6 g. of 5'-chloro-2-hydroxyaminoacetylanthanilic acid and 50 ml. of acetic anhydride was heated for 1 hour on the steam bath and partially concentrated. White crystals, 2.1 g., M.P. 208–210° dec., were obtained on cooling.

Analysis.—Calcd. for $C_{13}H_{11}ClN_2O_5$: C, 50.25; H, 3.56; N, 9.02; Cl, 11.41. Found: C, 50.32; H, 3.52; N, 8.85; Cl, 11.40.

EXAMPLE 21

2 - acetamido - 4' - chloro - 2 - morpholineacetanilide.—A slurry of 2.0 g. 2 - [acetoxy(acetyl)amino] - 4' - chloroacetanilide in 15 ml. of ethanol was added dropwise with stirring to a warm solution (65–70°) of 6.8 ml. of morpholine in 10 ml. absolute ethanol. The clear solution was heated at 70° for one hour. The solvent and excess reagent were removed first on the rotary evaporator and then by flowing a stream of nitrogen over the warm residue. The residue was crystallized from ethanol-water to give 1.15 g. of 2 - acetamido - 4' - chloro - 2 - morpholineacetanilide, M.P. 197–198.5°.

Analysis.—Calcd. for $C_{14}H_{18}N_3O_3Cl$: C, 53.94, H, 5.82; N, 13.48; Cl, 11.38. Found: C, 53.91; H, 6.04; N, 13.23; Cl, 11.5.

EXAMPLE 22

2 - acetamido - 4'- chloro - 2 - methylaminoacetanilide, is prepared from 2 - [acetoxy(acetyl)amino] - 4' - chloroacetanilide and methylamine in dimethoxyethane according to the procedure of Example 21.

EXAMPLE 23

2 - acetamido - 2 - ethoxy - 4' - chloroacetanilide, is prepared from 2 - [acetoxy(acetyl)amino] - 4' - chloroacetanilide and alcoholic sodium hydroxide according to the procedure of Example 21.

EXAMPLE 24

2 - acetamido - 4' - chloro - 2 - diethylaminoacetanilide, M.P. 148.5–150.5°, is prepared from 2-[acetoxy(acetyl)-amino] - 4' - chloroacetanilide and diethylamine according to the procedure of Example 21.

*Analysis.*—Calcd. for $C_{14}H_{20}ClN_3O_2$: C, 56.47; H, 6.77; N, 14.11; Cl, 11.91. Found: C, 56.78; H, 6.78; N, 14.07; Cl, 12.0.

EXAMPLE 25

2 - acetamido - 2' - carbomethoxy - 2 - methylamino acetanilide, M.P. 143–145°, is prepared from 2 - (2 - [acetoxy(acetyl)amino]acetamido) benzoic acid, methyl ester and methylamine, according to the procedure of Example 21.

*Analysis.*—Calcd. for $C_{20}H_{21}N_3O_6$: C, 60.14; H, 5.30; N, 10.52. Found: C, 59.89: H, 5.29; N, 10.58.

EXAMPLE 26

2 - acetamido - 2' - carbomethoxy - 2 - [o-carbomethoxyanilino]acetanilide, M.P. 215–217°, is prepared from 2 - (2 - [acetoxy(acetyl)amino]acetamido) benzoic acid, methyl ester and methylanthranilate according to the procedure of Example 21.

*Analysis.*—Calcd. for $C_{20}H_{21}N_3O_6$: C, 60.14; H, 5.30; N, 10.52. Found: C, 59.89: H, 5.29; N, 10.58.

EXAMPLE 27

2 - acetamido - 2 - amino - 2' - carbomethoxy acetanilide, M.P. 144–146°, is prepared from 2-(2-[acetoxy-(acetyl)amino] acetamido) benzoic acid, methyl ester and ammonia according to the procedure of Example 21.

*Analysis.*—Calcd. for $C_{12}H_{15}N_3O_4$: C, 54.33; H, 5.70; N, 15.84. Found: C, 54.34: H, 5.61; N, 15.83.

EXAMPLE 28

2 - acetamido - 4' - chloro - 2 - (methylamino) - 2' - methylcarbamoylacetanilide, M.P. 186–189°, is prepared from N[(6 - chloro - 4 - oxo - 4H - 3, 1 - benzoxazine - 2 - yl) acetoxymethyl]acetamide and methylamine according to the procedure of Example 21.

*Analysis.*—Calcd. for $C_{13}H_{17}ClN_4O_3$: C, 49.91; H, 5.49; N, 17.91; Cl, 11.34. Found: C, 49.76; H, 5.08; N, 18.34; Cl, 11.5.

EXAMPLE 29

2 - acetamido - 4' - chloro - 2 - (1,2 - dihydro - 2 - oxo-1 - pyridyl) acetanilide, is prepared from 2 - [acetoxy-(acetyl)amino] - 4' - chloroacetanilide and sodium pyridone according to the procedure of Example 21.

EXAMPLE 30

2 - acetamido - 2 - diethylamino - 2',6 - dimethylacetanilide, M.P. 177–179°, is prepared from 2-[acetoxy-(acetyl)amino] - 2',6' - dimethylacetanilide and diethylamine according to the procedure of Example 21.

*Analysis.*—Calcd. for $C_{16}H_{25}N_3O_2$: C, 65.95; H, 8.65; N, 14.42. Found: C, 65.97; H, 8.59; N, 14.15.

EXAMPLE 31

2 - acetamido - 4' - chloro - 2 - (phenethylamino)acetanilide, M.P. 130–131°, is prepared from 2-[acetoxy-(acetyl)amino] - 4' - chloroacetanilide and phenethylamine according to the procedure of Example 21.

*Analysis.*—Calcd. for $C_{18}H_{20}N_3O_2Cl$: C, 62.52; H, 5.83; N, 12.15; Cl, 10.25. Found: C, 62.49; H, 6.07; N, 11.97; Cl, 10.3.

EXAMPLE 32

2 - acetamido - 2 - amino - 4' - chloroacetanilide, M.P. 171–173°, is prepared from 2 - [acetoxy(acetyl)amino]-4' - chloroacetanilide and concentrated ammonium hydroxide according to the procedure of Example 21.

*Analysis.*—Calcd. for $C_{10}H_{12}N_3O_2Cl$: C, 49.69; H, 5.01; Cl, 14.67. Found: C, 49.58; H, 5.24; Cl. 14.8.

EXAMPLE 33

2 - acetamido - 4' - chloro - 2 - (2 - hydroxyethylamino)acetanilide, is prepared from 2 - [acetoxy(acetyl)-amino] - 4' - chloroacetanilide and ethanolamine according to the procedure of Example 21.

EXAMPLE 34

2 - acetamido - 4' - methoxy - 2 - morpholinoacetanilide, M.P. 184–186°, is prepared from 2-[acetoxy(acetyl)-amino] - 4' - methoxyacetanilide and morpholine according to the procedure of Example 21.

*Analysis.*—Calcd. for $C_{15}H_{21}N_3O_4$: C, 58.62; H, 6.89; N, 13.67. Found: C, 58.13; H, 6.82; N, 13.52.

EXAMPLE 35

2-acetamido-2-diethylamino - N - methylacetanilide.— This is prepared by reacting diethylamine with 2-[acetyl-(hydroxy)amino]-N-methylacetanilide, acetate according to the procedure of Example 21.

EXAMPLE 36

2-benzamido - 2 - diethylamino-4'-chloroacetanilide.— This is prepared by reacting diethylamine in solution with 2-[hydroxy(benzoyl)amino]-4'-chloroacetanilide, acetate according to the procedure of Example 21.

EXAMPLE 37

2-acetamido-4'-chloro-2-ethylthioacetanilide is prepared by the addition of 2-[acetoxy(acetyl)amino]-4'-chloroacetanilide to an excess of ethylmercaptan and triethylamine in ethanol and warmed to 60–65° C. The solvent is removed in vacuo and the product is obtained after recrystallization.

EXAMPLE 38

2-acetamido-4'-chloro - 2 - [6-aminopenicillanic acid] acetanilide is prepared from 2-[acetoxy(acetyl)amino] 4'-chloroacetanilide, 6-aminopenicillanic acid, and triethylamine by a procedure similar to that of Example 37. The acid was obtained after acidification of the reaction mixture.

EXAMPLE 39

2-acetamido-4'-chloro-2(p-sulfamylanilino) acetanilide, is prepared from 2-[acetoxy(acetyl)amino]-4'-chloroacetanilide, sulfanilamide, and triethylamine according to the procedure of Example 37.

EXAMPLE 40

2-acetamido-5'-chloro-2-morpohlino - 2' - sulfamylacetanilide, was prepared from 2-acetoxy(acetyl)amino]-5'-chloro-2'-sulfamoylacetanilide and aqueous morpholine. The solvent was concentrated in vacuo to dryness, the residue was redissolved in water and precepitated with several drops of acetic acid. The precipitate was collected and recrystallized from acetonitrile, M.P. 194–196°.

*Analysis.*—Calcd. for $C_{14}H_{19}ClN_4O_5S$: C, 43.02; H, 4.64; N, 14.33; Cl 9.07; S, 8.20. Found: C, 43.23; H, 4.88; N, 14.42; Cl, 9.0; S, 8.0.

EXAMPLE 41

2-acetamido - 2' - carboxy-4'-chloro-2-aminoacetanilide hydrate, M.P. 143–145°, is prepared from 2-(2[acetoxy-(acetyl)amino]-acetamido) - 5 - chlorobenzoic acid and conc. ammonium hydroxide according to the procedure of Example 40.

*Analysis.*—Calcd. for $C_{11}H_{12}ClN_3O_4 \cdot H_2O$: C, 43.50; H, 4.65; N, 13.84; Cl, 11.73; $H_2O$, 5.93. Found: C, 43.39; H, 4.97; N, 13.38; Cl, 12.00: $H_2O$, 6.39.

We claim:

1. The method of treating an N-acyloxy-N-acyl-aminoacetyl compound comprising reacting said acetyl compound at a temperature in the range of about 0° to 150° C., with a nucleophilic reactant possessing at least one active hydrogen atom whereby the acyloxy radical is eliminated and the nucleophilic group attaches to the 2-carbon position of the acetyl compound.

2. The method of forming a 2-acylamino acetamide compound comprising reacting a 2-acyloxyacylamino acetamide at a temperature in the range of about 20° to 80° C., with a nucleophilic reagent possessing an active hydrogen atom whereby the acyloxy radical is eliminated and the nucleophilic group attaches to the 2-carbon position of the acetamide compound.

3. The method of claim 2, wherein the reaction is carried out under basic conditions.

4. The method of claim 3, wherein the acetamido reactant is an N-aryl-2-acyloxy-acylamino acetamide and the final compound formed is an N-aryl-2-acylamino acetamide.

5. The compound, 2-[acetoxy(acetyl)amino]-4'-chloroacetanilide.

6. The compound, 2-acetamido - 2 - amino-2'-carbomethoxy acetanilide.

7. The compound, 2-acetamido-2-diethylamino - 2',6'-dimethylacetanilide.

8. The compound, 2-acetamido - 4' - chloro-2-diethylaminoacetanilide.

9. The compound, 2-acetamido-5'-chloro-2-morpholino-2'-sulfamoylacetanilide.

10. The compound, 2-acetamido-2'-carbomethoxy-2-methylamino acetanilide.

11. 2-[hydroxy(benzoyl)amino]-4'-chloroacetanilide.

12. 2-[hydroxy(acetyl)amino]-4'-chloroacetanilide.

13. 4'-chloro-2-hydroxyaminoacetanilide.

14. 4'-methoxy-2-hydroxyaminoacetanilide.

15. 2 - [acetoxy(acetyl)amino]-5'-chloro-2'-sulfamoylacetanilide.

16. 2-[acetoxy(acetyl)amino] - 2',6' - dimethylacetanilide.

17. 2-(2 - [acetoxy(acetyl)amino]acetamido) benzoic acid, methyl ester.

18. 2-[acetoxy(acetyl)amino]-N-cyclohexylacetamide.

19. 2-acetamido-4'-chloro-2-morpholineacetanilide.

20. 2-acetamido-4'-chloro - 2 - (phenethylamino)acetanilide.

21. 2-acetamido-2-amino-4'-chloroacetanilide.

22. 2-acetamido-4'-methoxy-2-morpholinoacetanilide.

No references cited.

ALEX MAZEL, *Primary Examiner.*

JOSE TOVAR, *Examiner.*